Figure 2:
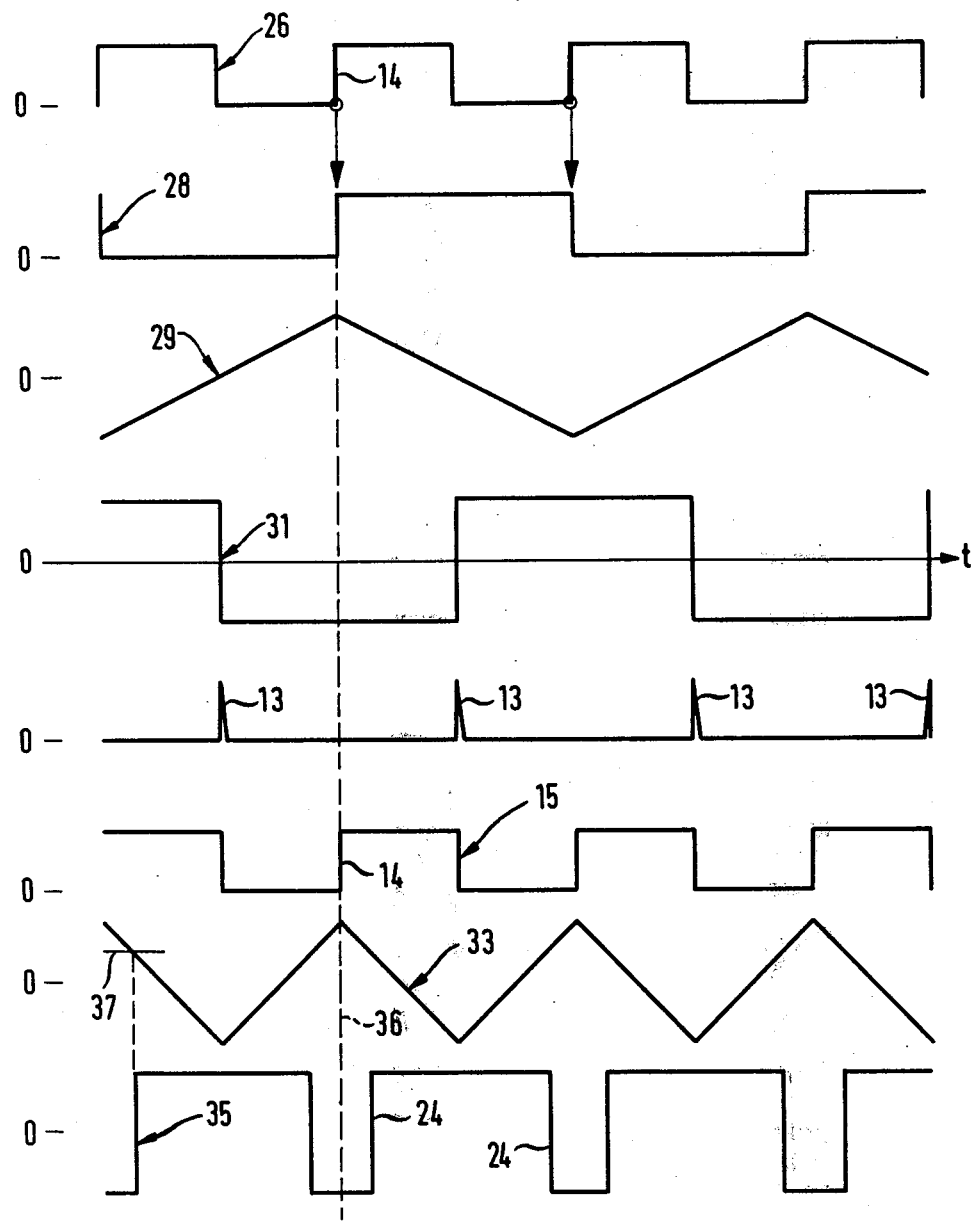

United States Patent [19]

Francke

[11] 4,129,814
[45] Dec. 12, 1978

[54] PROCESS FOR THE FORMATION OF A COMPARISON SQUARE WAVE SIGNAL

[75] Inventor: Erwin Francke, Munich, Germany

[73] Assignee: Erwin Sick Gesellschaft mit beschränkter Haftung Optik-Elektronik, Waldkirch, Germany

[21] Appl. No.: 692,563

[22] Filed: Jun. 3, 1976

[30] Foreign Application Priority Data

Jun. 19, 1975 [DE] Fed. Rep. of Germany ....... 2527375

[51] Int. Cl.² .............................................. G05B 19/36
[52] U.S. Cl. ..................................... 318/577; 318/599
[58] Field of Search .............................. 318/599, 577

[56] References Cited

U.S. PATENT DOCUMENTS

| 3,260,912 | 7/1966 | Gregory | 318/599 X |
| 3,582,750 | 6/1971 | Halfhill | 318/599 |
| 3,874,407 | 4/1975 | Griswold | 318/599 X |

Primary Examiner—B. Dobeck

[57] ABSTRACT

A method for the formation of a comparison square wave signal having a reference edge in a curve control device in which a scanning head periodically transversely scans a line to be tracked and transmits a base comparison square wave signal and a measurement square wave signal whose phase position is a criterion for the divergence of the scanning head from the desired value, and is determined by comparison with the position of the base comparison square wave signal, whereby a follow-up signal is formed which is dependent on the direction of the divergence. The method comprises forming by frequency halving, integration and threshold means, needle pulses from the base comparison square wave signal produced by the scanning head, each successive pair of the needle pulses being completely symmetrical to the reference edge and wherein the comparison square wave signal is formed from the needle pulses and the reference edge.

8 Claims, 2 Drawing Figures

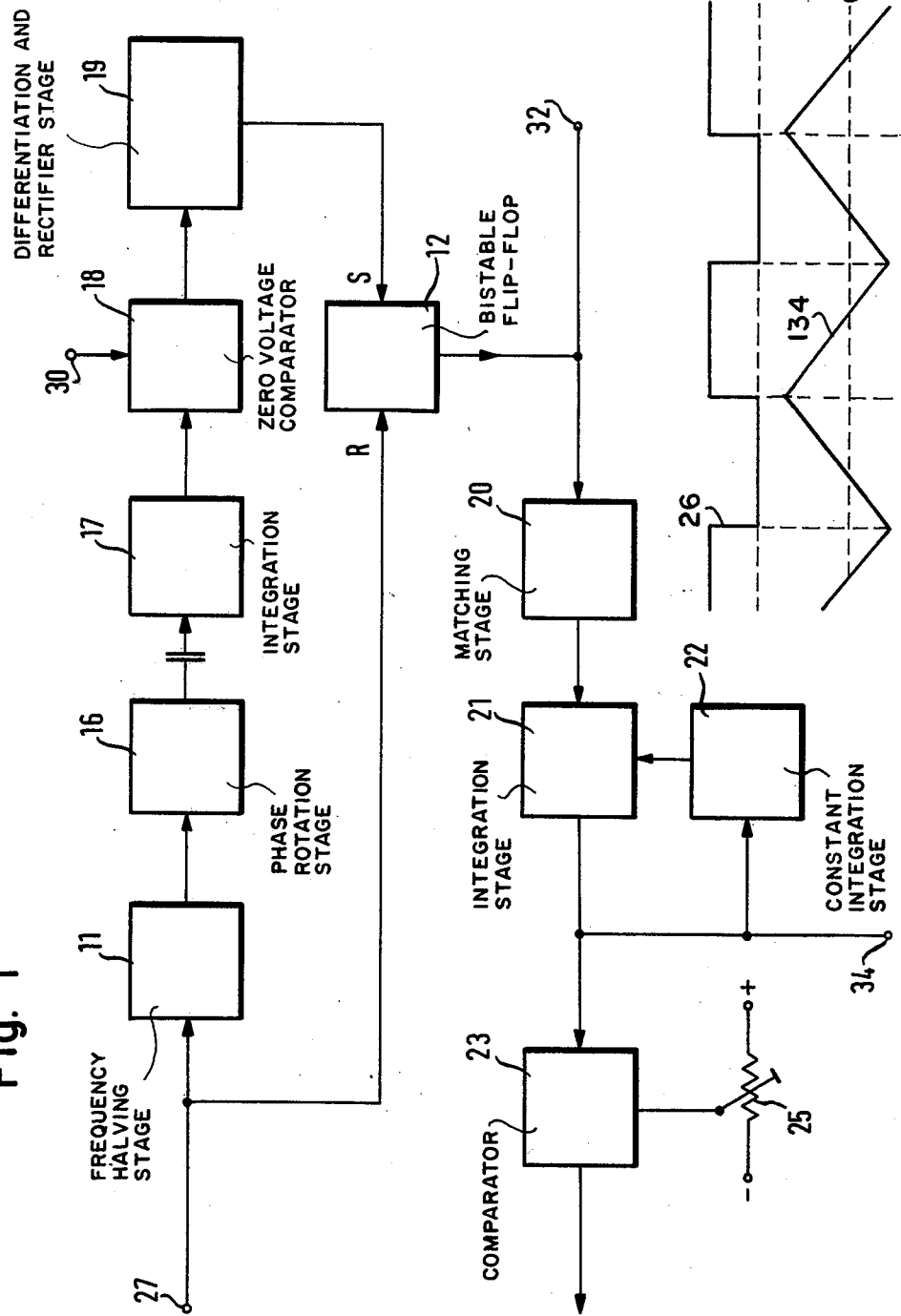
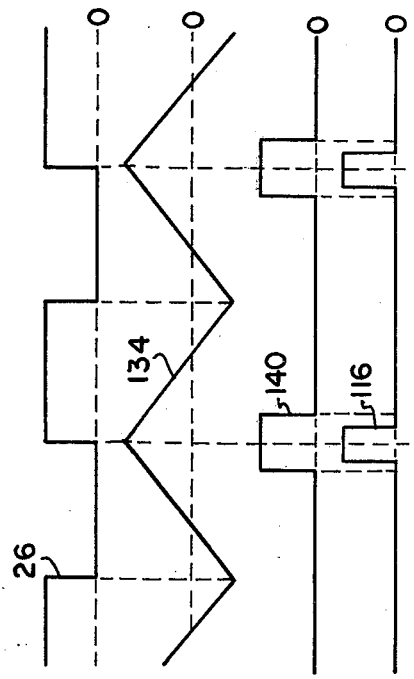
Fig. 1
Fig. 3 PRIOR ART

PROCESS FOR THE FORMATION OF A COMPARISON SQUARE WAVE SIGNAL

The invention relates to a process for the formation of a comparison square wave signal having a reference edge in a curve control device in which a scanning head periodically transversely scans a line to be tracked and transmits a square wave signal whose phase position is a criterion for the divergence of the scanning head from the desired value, and is determined by comparison with the position of the comparison square wave signal, whereby a follow-up signal is formed which is dependent on the direction of the divergence.

The scanning head of the curve control device generally contains a rotating diaphragm which not only periodically projects an image of the line to be scanned onto a photoelectric cell via slit diaphragms but simultaneously and synchronously with the line scanning breaks a light barrier at whose output a corresponding square wave signal is formed. The signal is fed to a monoflop which is re-set after a predetermined time so as to be ready for the next light barrier pulse.

The known curve control devices have the disadvantage that the rotary diaphragm or scanner disc provided in the scanning head must rotate at a very accurate speed. This not only requires that very close manufacturing tolerances are respected during the manufacture of the scanning device, but also it prevents the use of the device when the mains frequencies fluctuate greatly.

The problem of the invention is therefore to provide a process of the type indicated hereinbefore by means of which a symmetrical and optionally re-tuned comparison square wave signal is automatically formed.

According to the invention, this problem is solved in that by frequency halving integration and threshold formation needle pulses are formed from the base comparison square wave signal formed by the scanning head, whereby each successive pair of the needle pulses is completely symmetrical to the reference edge and wherein the comparison square wave signal is formed from the needle pulses and the reference edge. Therefore the fundamental concept of the invention is that only the successive reference edges of the base comparison square wave signals are processed in order in this way to obtain control pulses which are completely symmetrical to the reference edge. It is consequently possible to operate the device with mains frequencies of 48 to 62 Hz. Moreover, the requirements concerning the manufacturing tolerances of the scanning device are less stringent, whereby there has been a considerable improvement in the adjustment stability of the whole device.

A known circuit arrangement for measuring the divergence of the phase position of measuring pulses in which the invention is employed is described in DAS No. 1,616,061 referred to further below.

In a preferred apparatus for performing the process of the invention the base comparison square wave signal formed on the scanning head is applied to a frequency halving stage and one input of a bistable flip-flop, to whose other input are supplied the needle pulses formed from the halved frequency signal by integration threshold formation and differentiation. The bistable flip-flop is thereby set by the needle pulses and re-set by the reference edge of the base comparison square wave signals.

A further advantage of the circuit arrangement according to the invention is that the additional pulse for line pulse prolongation according to DAS No. 1,616,061 can be obtained independent of the frequency.

According to a preferred embodiment, a 180° phase rotation stage with a low impedance output to which the integration stage is applied is connected to the frequency halving stage. The integration stage for threshold formation is appropriately connected with a zero voltage comparator to which is applied a differentiation stage with a rectifier whose output is located at the other input of the bistable flip-flop.

The output of the bistable flip-flop is preferably connected to an integration stage via a low impedance matching stage with a 180° phase rotation. A square wave signal which is stable in amplitude and phase is then obtained at the output of this stage.

According to a further embodiment, the output voltage of the integration stage is kept constant by an integration constant derived from the output voltage and supplied to the integration stage.

Finally, the output of the integration stage can be supplied to a comparator which forms a window pulse for capture range limitation. This is the most important output quantity of the apparatus according to the invention because it is responsible for the follow-up quality. Due to the circuit arrangement according to the invention with analogue and digital elements, the capture range pulse sides are symmetrical to the reference edge of the base comparison square wave signal, independent of the frequency. The comparator reference signal is preferably adjustable, e.g. by means of a potentiometer in order to be able to adjust the capture range pulse width.

The invention will be explained hereinafter with reference to the drawings, wherein show:

FIG. 1, a block diagram of the circuit arrangement according to the invention;

FIG. 2, a pulse diagram showing the signals at the different points of the circuit arrangement according to the invention shown in FIG. 1.

FIG. 3 is a prior art pulse diagram.

According to FIGS. 1 and 2, the base comparison square wave signal 26 is on the one hand supplied via a terminal 27 to a frequency halving stage 11, and on the other to the re-setting input R of a bistable flip-flop 12.

In the prior art of DAS No. 1,616,061 mentioned above and illustrated in FIG. 3 a comparison square wave signal corresponding to the comparison square wave signal 26 of the present application is generated by a rotating disc having arcuate slots or projections interrupting a beam of light to a photoelectrical detector over a rotation angle of 45°, allowing the passage of the respective beam along a further rotation angle of 45°, interrupting the beam again over the next 45° of rotation and so on. On the same disc are arranged measuring slots scanning a curve or line along which the measuring head should be moved.

Measuring pulses delivered by measuring slots arranged in a 90° relationship are shown at 116. It is important to determine the phase relationship between the measuring pulse 116 and the comparison square wave pulse 140. For this comparison it is of extreme importance that the flanks of the comparison square wave pulse 140 are exactly symmetrical with respect to the broken lines shown.

The output signal of the frequency halving stage 11 is shown at 28 in the pulse diagram of FIG. 2.

An integration stage 17 is applied in capacitive manner to the frequency halving stage 11 by means of a 180° phase rotation stage 16 with a low impedance output. The output signal of stage 17 is the saw tooth wave signal designated by 29 in FIG. 2.

A zero voltage comparator 18 with a 180° phase rotation is connected to the integration stage 17. The zero reference voltage is applied to comparator 18 at 30. The output signal of the comparator is designated by 31 in FIG. 2.

Finally, the output signal of comparator 18 is applied to a differentiation and rectifier stage 19, at whose output occur the needle pulses 13 of FIG. 2. Due to the circuit arrangement according to the invention, the needle pulses 13 are completely symmetrical to the reference edge 14 of the base comparison square wave signal 26.

The needle pulses 13 appearing at the output of stage 19 are applied to the input S of the bistable flip-flop 12.

Due to the control of the bistable flip-flop 12 by the needle pulses 13, and the reference edge 14 of base comparison square wave signal 26, a square wave signal 15 appears at the output whose descending sides are completely symmetrical to the reference edge 14 which has remained at the same point, independently of the frequency. Signal 15 corresponds to signal 26, but relative to the latter is corrected in such a way that the descending sides have the above-indicated symmetry.

Whereas the symmetrical comparison square wave signal 15 can be directly taken off at 32, it can also be applied via a matching stage 20 with a low impedance output and optionally 180° phase rotation to an integration stage 21 which emits the output signal 33 of FIG. 2. Saw tooth wave signal 33 can be taken off at 34 and supplied for further utilisation. However, the saw tooth wave signal is also fed to a comparator 23 which must be considered as a threshold forming element and which performs a 180° phase rotation. Signal 35 in FIG. 2 occurs at the output of comparator 23 and constitutes the window pulse for the capture range limitation of the curve control device. As can be seen, the window pulses 24 are completely symmetrical to the downward prolongation 36 of reference edge 14 of the base comparison square wave pulses 26. An adjustable reference voltage can be supplied via a potentiometer 25 to comparator 23, by means of which the reference level 37 of square wave signal 33, and therefore the width of the window pulses can be regulated.

Finally, the output voltage of the integration stage can be kept constant by a constant integration stage 22 connected to the output of integration stage 21.

Thus, the invention not only makes it possible to obtain a precisely symmetrical comparison square wave signal, but it also permits the formation of a square wave signal which is stable in amplitude and phase and a window pulse which is completely symmetrical to the reference edge.

The amplitude stability of the square wave signal 33 is necessary to ensure that the scanning ratio of the window pulse 35 remains constant when the frequency changes. The capture range must not vary relative to the line pulse width.

I claim:

1. A method for the formation of a comparison square wave signal having a reference edge in a curve control device in which a scanning head periodically transversely scans a line to be tracked and transmits a base comparison square wave signal and a measurement square wave signal whose phase position is a criterion for the divergence of the scanning head from the desired value, and is determined by comparison with the position of the base comparison square wave signal, whereby a follow-up signal is formed which is dependent on the direction of the divergence, comprising forming by frequency halving, integration and threshold means, needle pulses from the base comparison square wave signal produced by the scanning head, each successive pair of the needle pulses being completely symmetrical to the reference edge and wherein the comparison square wave signal is formed from the needle pulses and the reference edge.

2. A method according to claim 1, wherein the base comparison square wave signal formed by the scanning head is applied to a frequency halving stage and one input of a bistable flip-flop, to whose other input are supplied the needle pulses formed from the halved frequency signal by integration threshold formation and differentiation.

3. A method according to claim 2, wherein a 180° phase rotation stage with a low impedance output to which the integration stage is applied is connected to the frequency halving stage.

4. A method according to claim 3, wherein an integration stage for threshold formation is connected with a zero voltage comparator to which is applied a differentiation stage with a rectifier whose output is located at the other input of the bistable flip-flop.

5. A method according to claim 2 wherein the output of the bistable flip-flop is connected to an integration stage optionally via a low impedance matching stage with 180° stage rotation.

6. A method according to claim 5, wherein the output voltage of the integration stage is kept constant by an integration constant derived from the output voltage and supplied to the integration stage.

7. A method according to claim 5, wherein the output of the integration stage is supplied to a comparator which forms a window pulse for capture range limitation.

8. A method according to claim 7, wherein the reference signal of the comparator is adjustable.

* * * * *